UNITED STATES PATENT OFFICE.

WILLIAM McMURTRIE, OF NEW YORK, N. Y.

PURIFICATION AND CLARIFICATION OF WATER.

No. 913,034.   Specification of Letters Patent.   Patented Feb. 23, 1909.

Application filed May 29, 1908. Serial No. 435,851.

*To all whom it may concern:*

Be it known that I, WILLIAM McMURTRIE, citizen of the United States, residing at New York, in the county of New York and State of New York, have invented certain new and useful Improvements in Purification and Clarification of Water, of which the following is a specification.

This invention relates to the purification and clarification of water and has particular reference to an improved process of removing finely divided suspended matter therefrom by producing therein an insoluble precipitate which will mechanically carry such matter down in sedimentation, or hold it back in filtration.

The invention has for its particular object, to provide a process which will be at once more efficient and less expensive than processes of purifying water which have been heretofore employed and which will avoid in the practice thereof, the production of gelatinous and slimy masses which interfere with filtration and sedimentation.

A further object of my invention is to provide a process which will free water from scale forming constituents and bacterial contaminations, and which will afford a residue or sludge, which will be a valuable fertilizer.

Heretofore tri-calcium phosphate has been utilized in the purification of sugar and other solutions but, it has been found in practice that this salt will not alone effect the satisfactory precipitation of finely divided suspended matter, even after long standing. The process is also open to the further objection that the residue or sludge contains the phosphate added in the form of tri-calcium phosphate, which is inefficient as a fertilizer.

Other attempts have been made to effect the purification of liquids by the employment of tri-calcium phosphates, but none of them has been found to be capable of being successfully employed in the purification of water.

I have discovered that I can satisfactorily accomplish the objects of my invention by utilizing a di-calcium phosphate in place of a tri-basic phosphate and that by such use of a di-basic phosphate even in the case of the lighter di-basic phosphates, as for example, di-calcium phosphate, I am able to effect the rapid and satisfactory purification of water and sewage without the employment of diatomaceous earth, or any other auxiliary filtering agent to assist in the removal of finely divided suspended matter.

In the practice of my process, in its preferred embodiment, I add to the water to be treated, a predetermined quantity of acid calcium phosphate, and when this has been thoroughly mixed with the water, if said water be free from salts of calcium and magnesium, I add thereto, a predetermined quantity of a basic substance, as for example, calcium, sodium or potassium hydroxid, or sodium or potassium carbonate. The reagents are so proportioned that the acid calcium phosphate will, in all cases, combine with all of the basic substance employed and will form therewith a di-basic phosphate. If an excess of the basic substance is present, tri-calcium phosphate will be formed which will interfere with the successful purification and clarification of the water in accordance with my process. If the water under treatment contains a sufficient quantity of soluble alkaline carbonates to produce, with the acid calcium phosphate added, a di-calcium phosphate, then the use of an additional basic substance is unnecessary and is to be avoided. In all cases, the mineral impurities of the water are to be determined and the reagents employed to effect the purification of the water added in such proportions that there will be no excess of basic materials and the product of the reaction will be a di-basic phosphate.

The following equation shows the proportions in which the reagents are ordinarily employed:

$$CaH_4(PO_4)_2 + Ca(OH)_2 = Ca_2H_2(PO_4)_2 + 2H_2O$$

When alkaline bases other than lime are used such for example, as caustic soda, the following equation indicates the proportions of the reagents.

$$2CaH_4(PO_4)_2 + 4NaOH = Ca_2H_2(PO_4)_2 + 2Na_2HPO_4 + 4H_2O$$

When calcium or magnesium chlorid is present in the water, the following equations indicate the proportions of the reagents required to produce the desired result:

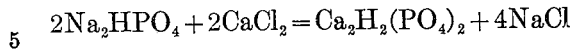

or

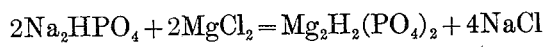

When the acid calcium phosphate or such phosphate and one or more basic materials have been added, there is produced within the water, a precipitate of di-calcium phosphate which, rapidly becoming crystalline, attaches itself to the suspended particles in the water and carries them down in sedimentation or holds them back in filtration. This makes it possible to separate the suspended solids by either sedimentation or filtration as preferred, and in case the process is applied to such turbid waters as sewage, it yields as a precipitate or sludge, a product which has a high agricultural value as fertilizer, because the organic matters contained in the liquid treated are separated out, and the di-basic phosphate itself is a very valuable plant food.

When the water contains scale forming constituents, other than carbonates, such as the chlorids or sulfates, I prefer to add to the water either before or after the addition of the phosphate, sodium or potassium carbonate. By this means such double decompositions ensue that the magnesium and calcium are removed from the water as di-basic phosphates.

The process may be successfully applied to the disposal of sewage. In this use of the process, the sewage is impounded and mixed with the necessary quantity of acid calcium phosphate alone, or mixed with a basic substance as milk of lime. To secure the most effective admixture of the acid calcium phosphate, it is charged into the sewer some distance from its outlet and, at a point nearer the outlet, milk of lime is added in the necessary quantity. Di-calcium phosphate is thus produced and when the sewage is impounded at the mouth of the sewer, sedimentation proceeds promptly with the separation of all suspended matter, the remaining liquid being a relatively clear effluent. If desired, the sewage may be filtered to secure more effectively a clear effluent. In either case, the sediment or sludge can be fully collected, preserved, dried, and used for fertilizer. It will contain in the form of di-basic phosphate, all of the phosphate added to the sewage. It will also contain all of the organic matters suspended in the sewage and a considerable portion of the soluble nitrogenous substances contained therein. It is thus possible by my process, to recover for use as fertilizer, practically all of the sewage waste of cities together with all the phosphates used in the process.

I have found that some measure of success may be attained by the substitution of phosphoric acid or a mixture of such acid with acid calcium phosphate for the acid calcium phosphate hereinbefore referred to, in proportions to produce di-calcium phosphate with the basic calcium salts present in the water, or added thereto as described. It will be evident however, that when phosphoric acid, or such acid together with acid calcium phosphate is used, a greater amount of lime is required to produce the di-calcium phosphate than when acid calcium phosphate alone is employed.

Having fully described my invention, I claim:

1. A process of clarifying and purifying water, which consists in causing a predetermined quantity of a reagent containing the phosphate radical to react in the presence of said water, with a basic substance adapted to form therewith a precipitate of phosphate insoluble in water, the phosphate radical being added in such proportions as to combine with all of said basic substance, and to form therewith a di-basic phosphate.

2. A process of clarifying and purifying water, which consists in causing a predetermined quantity of an acid phosphate to react in the presence of said water, with a basic substance adapted to form therewith a precipitate insoluble in water, the phosphate being added in such proportions as to combine with all of said basic substance, and to form therewith a di-basic phosphate.

3. A process of clarifying and purifying water, which consists in causing a predetermined quantity of acid calcium phosphate to react in the presence of said water, with a basic substance adapted to form therewith a precipitate insoluble in water, the phosphate being added in such proportions as to combine with all the said basic substance and to form therewith a di-basic phosphate.

4. A process of clarifying and purifying water which consists in adding thereto in a selected order of succession, a predetermined quantity of acid calcium phosphate and a corresponding predetermined quantity of a basic substance, the said reagents being employed in proportion to produce, by their reaction, a precipitate of a di-basic phosphate.

5. A process of clarifying and purifying water, which consists in mixing therewith a predetermined quantity of acid calcium phosphate, then adding a predetermined quantity of a basic substance, the said reagents being added in proportions to produce a precipitate of di-calcium phosphate.

6. A process of clarifying and purifying water, which consists in causing a predetermined quantity of acid calcium phosphate to react in the presence of said water with a basic substance adapted to form therewith a precipitate insoluble in water, the phosphate being added in such proportions as to combine with all of said basic substance and to form therewith a di-basic phosphate, said basic substance having a molecular weight not in excess of that of the corresponding compound of calcium.

7. A process of clarifying and purifying water, which consists in successively adding thereto a predetermined quantity of acid calcium phosphate and a corresponding predetermined quantity of a basic substance, the said reagents being employed in proportions to produce, by their reaction, a precipitate of a di-basic phosphate, the said basic substance having a molecular weight not in excess of that of the corresponding compound of calcium.

WILLIAM McMURTRIE.

Witnesses:
J. F. CHUMASERO,
EVAN S. SHERLOCK.